United States Patent [19]

Behrens

[11] 4,092,303

[45] May 30, 1978

[54] POLYACRYLATE ELASTOMERS WITH IMPROVED ELASTICITY

[75] Inventor: Rudolf Adolf Behrens, Gladstone, N.J.

[73] Assignee: American Cyanamid Company, Stamford, Conn.

[21] Appl. No.: 580,868

[22] Filed: May 27, 1975

[51] Int. Cl.² .................. C08F 28/00; C08F 27/06; C08F 28/02

[52] U.S. Cl. .................. 260/79.5 P; 260/23 AR; 260/79.5 C; 260/836; 260/884; 260/885; 526/292

[58] Field of Search ............ 260/80.72, 80.73, 80.75, 260/80.81, 80.76, 86.1 R, 86.1 E, 836, 884, 885, 79.5 P, 79.5 R, 79.5 C, 23 AR

[56] References Cited

U.S. PATENT DOCUMENTS

| | | | |
|---|---|---|---|
| 3,201,373 | 8/1965 | Kaizerman | 260/79.5 R |
| 3,201,497 | 8/1965 | Heimo | 260/80.72 |
| 3,251,906 | 5/1966 | Bauer | 260/884 |
| 3,303,050 | 2/1967 | Roberts | 260/80.73 |
| 3,312,677 | 4/1967 | Rosen | 260/80.72 |
| 3,397,193 | 8/1968 | Aloia et al. | 260/80.81 |
| 3,624,058 | 11/1971 | Jorgensen | 260/80.73 |
| 3,632,677 | 1/1972 | Petner et al. | 260/885 |
| 3,655,826 | 4/1972 | Fellmann et al. | 260/884 |
| 3,663,467 | 5/1972 | Albright | 260/86.1 E |
| 3,745,196 | 7/1973 | Lane et al. | 260/836 |
| 3,746,674 | 7/1973 | Behrens | 260/79.5 P |
| 3,763,087 | 10/1973 | Holub et al. | 260/885 |
| 3,766,299 | 10/1973 | Dornte | 260/885 |
| 3,843,612 | 10/1974 | Vogel et al. | 260/86.1 R |
| 3,864,426 | 2/1975 | Salensky | 260/885 |
| 3,939,128 | 2/1976 | Behrens | 260/23 AR |

*Primary Examiner*—Herbert J. Lilling
*Attorney, Agent, or Firm*—Frank M. Van Riet

[57] ABSTRACT

This invention relates to polyacrylate elastomers with improved elasticity, tear strength and abrasion resistance, having incorporated therewith certain unsaturated esters and amides of acrylic and methacrylic acid.

5 Claims, No Drawings

POLYACRYLATE ELASTOMERS WITH IMPROVED ELASTICITY

BACKGROUND OF THE INVENTION

This invention relates to polyacrylate elastomers with improved elasticity, tear strength and abrasion resistance. More particularly, it relates to a method for improving the elasticity, tear strength and abrasion resistance of polyacrylate elastomers by incorporating therein certain unsaturated esters and amides, defined hereinbelow.

Polyacrylate elastomers have been used extensively as special purpose elastomers where good low temperature properties and oil resistance are important, for example, in automobile gaskets, oil seals, and the like. These elastomers would be more broadly acceptable if it were not for their relatively high elastic modulus and low elongation at break.

Methods which are conventionally used to lower the elastic modulus of elastomers, such as reduction in the concentration of curative, changing the type and level of filler, addition of plasticizers, or a reduction of the concentration of cross-linking sites along the polymer backbone, are not effective. Such attempts have led instead to significant reductions in tensile strength, tear strength and abrasion resistance.

As a consequence, there remains a need for a method for reducing the elastic modulus of polyacrylate elastomers, without affecting unduly the other desirable properties, such as tensile strength, tear strength, compression set and abrasion resistance.

SUMMARY OF THE INVENTION

It has now been discovered that the elastic modulus of polyacrylate elastomers is significantly improved by the addition thereto, or incorporation therein, of certain esters and amides containing the structural grouping (I),

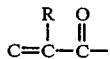
(I)

where R is a hydrogen atom or a methyl group; or, stated alternatively, wherein said esters and amides contain a double bond on a carbon atom situated in a position alpha to a carbonyl group.

The present invention provides a method for effectively improving the elastic modulus of polyacrylate elastomers. The method unexpectedly provides improvements in tear strength and abrasion resistance without concommitant significant loss in tensile strength and without unduly affecting compression set properties. Moreover, the improved elasticity provided by the invention is retained after the elastomer has been aged in hot oils.

It is therefore an object of the invention to provide polyacrylate elastomers having improved elasticity.

It is another object of the invention to provide a method for improving the elastic modulus of polyacrylate elastomers.

DESCRIPTION OF PREFERRED EMBODIMENTS

In accordance with the objects of the invention an effective amount of a compound having a double bond on a carbon atom alpha to a carbonyl group is incorporated, by conventional means, into a polyacrylate elastomer composition to provide a polyacrylate elastomer having improved elasticity.

THE ELASTOMERS

The invention contemplates broadly all vulcanizable acrylate elastomers having an active-halogen atom or an epoxide group, including those elastomers disclosed in U.S. Pat. Nos. 3,201,373; 3,335,118; 3,493,545; 3,397,193 and 3,312,677; see also Vial, Rubber Chem. & Tech. 44,344(1971). More specifically, the invention contemplated acrylic elastomers prepared by polymerizing a major proportion of one or more alkyl acrylates, for example ethyl acrylate, with a minor proportion, e.g. 1–10 mole percent, of various chlorine and bromine containing compounds co-polymerizable therewith, for example, vinyl chloroacetate, 2-chloroethyl acrylate or vinyl chloroethyl ether, preferably vinyl chloroacetate, or compounds containing an epoxide group, e.g. allyl glycidyl ether. An example of a preferred polyacrylate elastomer is a 95/5 copolymer of ethyl acrylate and vinyl chloroacetate or vinyl chloroethyl ether. The elastomeric compositions may optionally contain minor amounts of other copolymerizable vinyl monomers, such as acrylonitrile, alkoxyalkyl acrylates, e.g., methoxyethyl acrylate, or cyanoethyl acrylate, and the like. The polymers are made by conventional free radical initiated emulsion or suspension polymerization systems.

THE COMPOUNDS

Compounds falling within the purview of formula (I) which are effective in providing acrylate elastomer compositions with improved elasticity include esters and amides of acrylic and methacrylic acid.

A. Acrylic and methacrylic acid esters, including mono- and diacrylates and methacrylates of alkylene diols, for example, ethylene glycol, such as ethylene diacrylate and ethylenedimethacrylate and the like; mono-, di- and triacrylates and methacrylates of polyhydric alcohols, such as those represented by the formula (II),

where R is hydrogen or lower alkyl, for example, the mono-, di- and triacrylates and methacrylates of trimethylolethane and trimethylolpropane; the mono-, di-, tri- and tetraacrylates and methacrylates of pentaerythritol, and the like.

B. Acrylic and methacrylic acid amides, including acrylamide and methacrylamide; mono- and di substituted acrylamides and methacrylamides, e.g., N-alkyl and N,N-dialkyl acrylamides and methacrylamides, N-alkoxyalkyl- and N,N-di(alkoxyalkyl) acrylamides and methacrylamides, N-methylolacrylamide; alkylenebisacrylamides and methacrylamides, such as methylenebisacrylamide; oxydialkylenebisacrylamides and methacrylamides, such as oxydimethylenebisacrylamide, and the like.

The mechanism by which the aforementioned additives function to provide polyacrylate elastomers with improved elastic modulus, tear strength and abrasion resistance is not fully understood. Moreover the effectiveness of individual additives varies as does the amount needed to achieve the desired result. I have found that acrylic acid esters and N-substituted acrylamides provide desirable improvements in the aforesaid physical properties and are therefore preferred additives in the practice of the invention. I have also found that the compatibility of the additive with the elastomer is important in achieving the desired results and to the extent that any given additive is incompatible it is less effective. For example, methylene bisacrylamide is relatively incompatible with the elastomers; However, if finely divided it is effective.

Thus, the amount of the various additives needed may vary widely. Generally, however, I have found that improvements in the properties of the elastomer are realized when the additives are used at a concentration of from about 0.5 to 10 parts per 100 parts of elastomer, and preferably from about 0.75 to 3 parts per 100 parts of elastomer.

The elastomer compositions may be compounded with other conventional compounding ingredients such as carbon black and other fillers, antioxidants, sulfur, accelerators, plasticizers, and the like, using conventional techniques, such as milling, or Banbury mixing.

Physical properties in the following examples are determined according to conventional procedures: volume swell in hydrocarbon oils in accordance with ASTM D 471; compression set in accordance with ASTM D 395, Method B and abrasion resistance in accordance with ASTM D 1630.

The following examples more fully describe the invention and its advantages.

EXAMPLE 1

The additives shown in Table 1 were incorporated into separate portions (containing 100 parts of elastomer) of the following masterbatch formulation:

|  | Parts by Weight |
|---|---|
| Polymer (1) | 1400 |
| FEF Carbon Black | 840 |
| Stearic Acid | 28 |
| Antioxidant(2) | 28 |
| Sulfur | 3.5 |
| Sodium 2-ethyl hexanoate (50% active) | 112 |

(1) 94% of a mixture of 85% ethylacrylate and 15% butylacrylate - 6% vinylchloroacetate
(2) BLE - acetone-diphenylamide condensate The compositions were compounded on a standard 2-roll rubber mill, cured for 15 minutes at 330° F. and postcured for 4 hours at 350° F.

(Compositions B thru N)

Table 1 illustrates the considerably increased elongation and lower modulus with minimal or no effect on tensile properties as compared with composition A which does not contain the additive. Moreover, the Table illustrates the significant improvement in tear strength achieved, the general overall retention of compression set properties and an improvement in the abrasion resistance.

Table I

| Additive | A | B | C | D | E | F | G | H | J | K | L | M | N |
|---|---|---|---|---|---|---|---|---|---|---|---|---|---|
| Oxydimethylene bisacrylamide | — | 0.75 | 1.5 | 3.0 | | | | | | | | | |
| Isobutoxymethyl acrylamide | | | | | 0.75 | 1.5 | 3.0 | | | | | | |
| Pentaerythritol diacrylate | | | | | | | | 0.75 | 1.5 | | | | |
| Pentaerythritel tetraacrylate | | | | | | | | | | 0.75 | 1.5 | | |
| Acrylamide | | | | | | | | | | | | 0.75 | 1.5 |
| Stress-Strain Properties | | | | | | | | | | | | | |
| Modulus, psi at 100 | 1690 | 1410 | 1165 | 1040 | 1380 | 1205 | 1160 | 1265 | 1165 | 1335 | 1235 | 1250 | 1110 |
| Tensile, psi | 2155 | 2125 | 2035 | 1925 | 2045 | 2080 | 1990 | 2110 | 2060 | 1950 | 2060 | 2080 | 1960 |
| Elongation, % | 125 | 145 | 165 | 165 | 140 | 160 | 160 | 155 | 165 | 145 | 160 | 160 | 165 |
| Hardness, Shore | 71A | 73A | 72A | 70A | 71A | 70A | 73A | 69A | 69A | 71A | 70A | 69A | 68A |
| Tear Strength, Die C pli | 100 | 132 | 134 | 142 | 112 | 126 | 131 | — | — | — | — | — | — |
| NBS Abrasion (Blocks cured 20 min. at 350° F., post cured 6 hrs. at 350° F.) | 52.9 | 58.1 | 78.1 | 67.0 | | | | | | | | | |
| Compression set, % (blocks cured 20 min. at 330° F., post-cured 6 hrs. at 350° F., Method B) | 32.0 | 29.0 | 30.5 | 28.5 | 30.5 | 28.0 | 28.0 | 36.0 | 29.5 | 30.0 | 33.0 | 30.0 | 30.0 |

EXAMPLE 2

Following the procedure of Example 1 the additives shown in Table II were evaluated in the formulation below:

| Formulation | Parts by Weight |
|---|---|
| Polymer (1) | 100 |
| FEF Carbon black | 60 |
| Stearic acid | 0.5 |
| Sorbitan monostearate (2) | 1.0 |
| Antioxidant (3) | 4.0 |
| Sodium 2-ethylhexanoate (50% active) | 8.0 |
| Sulfur | 0.25 |

(1) 94% ethyl acrylate - 6% vinyl chloroacetate
(2) lubricant
(3) BLE : acetone - diphenylamine condensate Table II

| Additive | A | B | C | D | E | F | G | H | J |
|---|---|---|---|---|---|---|---|---|---|
| Methylenebis-acrylamide | | 1.0 | 2.5 | — | — | — | — | | |
| N-Methylol-acrylamide | | | | 0.25 | 0.5 | 1.0 | 2.5 | 5.0 | 10.0 |
| Stress-Strain Properties | | | | | | | | | |
| Modulus, psi α 100% | 1170 | 927 | 800 | 1035 | 1035 | 780 | 636 | 632 | 667 |
| Tensile, psi | 2040 | 2000 | 1910 | 1965 | 2033 | 1935 | 1818 | 1817 | 1800 |
| Elongation, % | 170 | 205 | 220 | 186 | 199 | 228 | 247 | 262 | 266 |

Table II-continued

| Additive | A | B | C | D | E | F | G | H | J |
|---|---|---|---|---|---|---|---|---|---|
| Hardness, Shore A | 76 | 75 | 74 | 75 | 76 | 76 | 74 | 75 | 76 |

Table II illustrates the effect of increasing concentration of N-methylolacrylamide on the elasticity.

EXAMPLE 3

Following the procedure of Example 1 the additives shown in Table III were evaluated in the formulation below:

| Formulation | Parts by Weight |
|---|---|
| Polymer (1) | 100 |
| FEF Carbon Black | 60 |
| Stearic acid | 2 |
| Sulfur | 0.25 |
| Sodium 2-ethylhexanoate (50% active) | 8.0 |

(1) 94% ethyl acrylate - 6% vinyl chloroacetate

Table III

| Additive | A | B | C | D |
|---|---|---|---|---|
| Isobutoxymethylacrylamide | 1.5 | | | |
| N-Methylolacrylamide | | 1.5 | | |
| Ethylenedimethacrylate | | | 1.5 | |
| Trimethylol propane trimethacrylate | | | | 1.5 |

Stress-strain properties: cured 15 min. at 330° F., post-cured 4 hours at 350° F.

| | A | B | C | D | Control |
|---|---|---|---|---|---|
| Modulus at 100%, psi | 1475 | 870 | 1450 | 1240 | 1740 |
| Tensile, psi | 2130 | 1880 | 2065 | 2000 | 2070 |
| Elongation, % | 152 | 175 | 142 | 160 | 135 |
| Hardness, Shore A | 75 | 73 | 80 | 75 | 75 |
| Tear, Die C, pli | — | 146 | — | — | 116 |
| NBS Abrasion* | 61.0 | 61.5 | 52.5 | 55.5 | 54.5 |

Oil aging: Samples aged in ASTM No. 3 oil for 1 week at 300° F.

| | A | B | C | D | Control |
|---|---|---|---|---|---|
| Modulus at 100%, psi | 1140 | 975 | 1200 | 1220 | 1520 |
| Tensile, psi | 1990 | 1900 | 1950 | 1850 | 1985 |
| Elongation, % | 155 | 171 | 146 | 145 | 122 |
| Hardness, Shore A | 64 | 62 | 68 | 65 | 64 |

*Blocks cured for 20 minutes at 330° F. and post-cured for 6 hours at 350° F.

The data in Table III illustrates the improvement in elasticity of Compositions A through D versus the control; improved abrasion resistance and tear strength; and retention of elasticity of Compositions A through D following aging in hot oil.

I claim:

1. A polyacrylate elastomer having improved elasticity produced by (A) copolymerizing a major proportion of one or more acrylic acid esters and from about 1 to about 10 mole percent of an active-halogen containing vinyl monomer to form a copolymer, (B) adding to said copolymer from about 0.5 to about 10 parts, by weight, per hundred thereof, of an unsaturated compound selected from the group consisting of (1) mono- and diesters of acrylic or methacrylic acid and an alkylene diol, (2) mono-, di- and triesters of acrylic or methacrylic acid and a polyhydric alcohol having the formula R-C($CH_2OH)_3$ wherein R is hydrogen or lower alkyl, (3) mono-, di-, tri- and tetraesters of acrylic or methacrylic acid and pentaerythritol, (4) acrylamide or methacrylamide, (5) N-alkyl or N,N-dialkylacrylamides or methacrylamides, (6) N-alkoxyalkyl or N,N-di(alkoxyalkyl)acrylamides or methacrylamides, (7) N-methylolacrylamide or N-methylolmethacrylamide, (8) alkylenebisacrylamides or methacrylamides and (9) oxydialkylenebisacrylamides or methacrylamides and (C) vulcanizing the resultant composition with sulfur.

2. The elastomer of claim 1 wherein said active-halogen containing vinyl monomer is vinyl chloroacetate.

3. The elastomer of claim 1 wherein said unsaturated compound is an acrylic acid mono-, di-, tri- or tetraester of pentaerythritol.

4. The elastomer of claim 1 wherein said unsaturated compound is N-methylol acrylamide.

5. The elastomer of claim 1 wherein said unsaturated compound is added in an amount of 0.75 to 3.0 parts per hundred.

* * * * *